March 14, 1961  R. A. CHACE  2,974,638
MIDSTROKE LOCKING DEVICES
Filed March 3, 1959
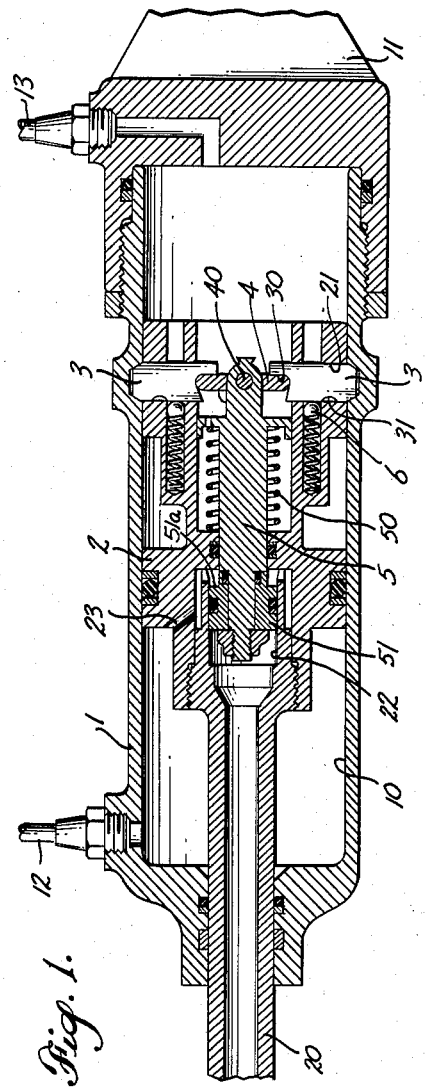
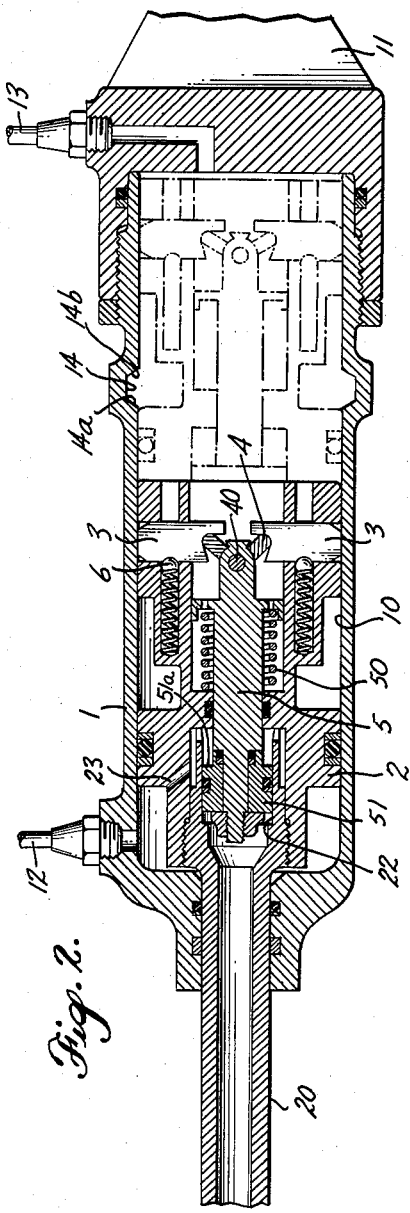
INVENTOR.
RICHARD A. CHACE
BY
Reynolds, Beach & Christensen
ATTORNEYS United States Patent Office 2,974,638
Patented Mar. 14, 1961

2,974,638
MIDSTROKE LOCKING DEVICES
Richard A. Chace, Bellevue, Wash., assignor, by mesne assignments, to Western Hydraulic & Service Company, Inc., Gardena, Calif., a corporation of California
Filed Mar. 3, 1959, Ser. No. 796,833
8 Claims. (Cl. 121—40)

This invention concerns a two-part hydraulically unlocked actuator, or the same can be used merely as a retaining device, whereby a member secured to one part can move or be moved relatively to a member secured to the other part, repeatedly to opposite sides of a given point, yet upon becoming centered by return of the members to a neutral position can be actuated by cessation of hydraulic pressure to lock the members in that position against relative movement, until such time as the locking means is unlocked by positive action, as by application of hydraulic pressure.

Such a device should be reliable in its locking action, secure after hydraulic unlocking against unintended relocking, so that it is movable freely to either side of its locked position when unlocked without possibility of interference. Its form should be simple, and the locking mechanism is preferably of the type disclosed in the patent to myself and George C. Newell, Jr., No. 2,744,501, dated May 8, 1956, or the patent to Bakke, No. 2,764,132, dated September 25, 1956.

The invention is shown in an illustrative embodiment in the accompanying drawings.

Figure 1 is an axial sectional view of the device, with parts locked in their centered or midstroke position, and Figure 2 is a like view, but showing the range of displacement of the parts.

A housing 1 defines a cylinder 10 within which a piston assembly, including the piston 2 and a piston rod 20, is reciprocable. The piston rod 20 projects through one end of the housing 1, whereby the housing may be connected, as for example at 11, to one of two members that are to be held against movement or to be permitted or caused to move as the case may be, and the opposite end of the piston rod 20 is connected to the other such member. In this embodiment, connections are provided at 12 and at 13 for admission of fluid at superior pressure alternatively to the opposite ends of the cylinder 10 and for release of lesser pressure at the other end, such fluid pressure serving to insure retention of parts in the unlocked position, as well as moving or assisting in the movement relatively of the two members.

The locking device between the piston and piston rod assembly and the housing 1 includes locking dog means 3, which are guided at 21 in the assembly for radial projective and retractive movement. Normally, the projective movement would be radially outwardly, but this is not necessarily the case. These locking dogs, when in proper registry with the groove 14 within the interior of the housing 1, will engage oppositely directed shoulders 14a and 14b to retain the assembly, including the piston 2, immovable and in a midstroke or centered position with respect to the housing 1 and cylinder 10. It will be noted that the shoulders 14a and 14b, in accordance with the principles of the two patents mentioned above, are beveled and the surfaces at the tips of the locking dogs 3 which engage with these shoulders are complementally beveled.

The locking device further includes toggle means such as the links 4 pivotally mounted at 40 upon a slide or plunger 5, which is guided within a bore 22 within the piston 2 or the assembly of which it is a part, whereby, upon axial movement of the plunger 5 within its bore to the left as viewed in the drawings, the toggle links 4 will swing inwardly into a position permitting inward or retractive movement of the dogs 3. Upon movement of the plunger to the right, the toggle links 4 will swing outwardly into alignment with the dogs to move them into and retain them in their locking position, provided they are in registry with the groove 14. A shoulder 30 upon the dogs will engage the toggle links 4 to prevent appreciable movement of the latter beyond their aligned locking position.

A spring 50 reacts between the piston 2 and the plunger 5 to urge the plunger and hence the toggle links and dogs 3 in the sense to lock them. It is this spring which, in the absence of pressure within the cylinder, effects relocking.

The plunger 5 is formed at one end, as indicated at 51, as a small piston reciprocable within the bore 22 under the influence of hydraulic pressure admitted from the left end of the cylinder 10 to the right hand end of the piston 51, by way of a port 23 in the piston and piston rod assembly. In addition, the opposite end of the plunger at the right is exposed to pressure within the right hand end of the cylinder 10, which is the opposite side of the piston 2 to that which subjects the piston 51 to pressure. Pressure applied at either place tends to urge the plunger to the left in opposition to its spring 50 to enable retraction of the locking dogs. Upon removal of pressure, the spring 50 acts to urge the dogs 3 into locking engagement with the shoulders, but this movement can actually occur only when the piston 2 is in its midstroke position.

It is desirable, however, to permit the piston when unlocked to move freely and repeatedly to either side of its midstroke or locked position. Accordingly, detent means such as the spring-pressed balls 6 are provided and are carried in the piston and piston rod assembly in position to engage in recesses 31 of the dogs in order to retain the dogs retracted. This position of the parts is shown in Figure 2. The force of spring 50 is sufficient to release the detents 6, provided there is no hydraulic pressure in either end of the cylinder to urge the plunger 5 in the unlocking direction.

Assuming that the parts are in the locked position of Figure 1, application of pressure fluid through the connection 12 will first cause pressure to be applied to the right hand face 51a of the piston 51, urging it to the left since its left hand face communicates at all times with a low pressure region. The piston 2 is also subjected to this pressure at its left hand face, which can effect movement between the members connected to the piston rod and the cylinder, respectively, but actual movement can be accomplished by separate actuators for such members if preferred. The movement of the piston 51 to the left retracts the toggle links 4 and the reaction between the beveled tips of the dogs and the shoulders 14a under the urging of the piston 2 to the right moves the dogs inwardly, and effects movement of the piston and piston rod assembly to the right. If it were desired to move to the left, application of pressure fluid through the connection at 13 would first act on the projecting right end of the plunger 5, moving it to the left and, at the same time, the pressure acting upon the piston 2 would tend to move the latter to the left, but again, actual movement can be caused by separate actuators.

Retractive movement of the dogs 3 brings their depressions 31 into engagement with the detents 6, and these latter, aided by pressure in one end or the other of the cylinder 1, retain the dogs retracted, permitting movement of the piston and piston rod assembly repeatedly past the midstroke position without reengaging the locking means, as the dogs pass the groove 14, and without necessitating frictional contact of the dogs with the cylinder wall. The members connected at 11 and to the piston rod 20, respectively, may move freely with respect to one another throughout the range of movement indicated by the full line and dot-dash line positions of Figure 2.

Whenever locking is required, regardless of the positions of the parts, the control surface is centered by its normal control means, which centers the piston 2, and then pressures are relieved from the opposite faces of the piston 2. This allows the plunger 5 to move to the right under the influence of spring 50. The force of the spring 50 is sufficient to overcome the restraining effect of the detents 6 and, upon the dogs 3 coming into registry with the groove 14, the spring 50 will snap them outwardly into locking position and retain them thus locked until pressure is again applied to one or the other face of the piston 2.

This invention in certain respects is similar in subject matter to that disclosed in a companion application, Serial No. 796,943, filed the same day as this application, and claims generic to the common subject matter are included in the latter case.

I claim as my invention:

1. A midstroke locking device comprising a cylinder ported at its opposite ends for admission of pressure fluid to either end, and relief at the opposite end, an assembly including a piston axially slidable within said cylinder under the influence of pressure applied to one or the other of its faces, and a piston rod projecting from one end of the cylinder, said assembly having a through axial bore communicating at its opposite ends with the respective ends of the cylinder, a plunger received in and closing said bore, and movable axially therein in a first sense under the influence of pressure within a first end of the cylinder, spring means to return said plunger, upon relief of such pressure, in the opposite, second sense, passage means affording communication between the second end of the cylinder and a face of the plunger to move the latter also in the first sense, in opposition to said spring means, under the influence of pressure within the second end of the cylinder, and complemental fixed and movable locking elements carried by the cylinder and by the piston assembly, respectively, and disengageable by pressure-induced movement of the plunger, but interengageable when brought into registry by the axial movement of the piston to a midstroke position, said spring means and plunger being operatively connected to the movable piston-carried locking element to urge the latter into locking position only in the absence of pressure applied to the plunger from either end of the cylinder.

2. A device of the character set forth in claim 1, including detent means engageable between the assembly and the movable locking means and arranged to retain said locking means in released position so long as pressure is applied from either end of the cylinder to the plunger, but of a strength to be overcome and disengaged by said spring means upon cessation of such pressure.

3. A device of the character set forth in claim 1, wherein the movable locking means includes dog means guided in the assembly for radial projective and retractive movement, toggle devices mounted upon and swingable relative to the plunger, and operatively engaged with but disconnected from said dog means to urge the latter in the projective direction under the influence of the spring means, but leaving the toggle devices free of the dog means for retractive movement, and the complemental fixed locking means on the cylinder comprises a shoulder engageable by the dog means when projected.

4. A device of the character set forth in claim 3, including two oppositely facing shoulders spaced apart for simultaneous engagement by the dog means when parts are in the midstroke locking position.

5. A device of the character set forth in claim 4, wherein the shoulders are beveled, and the shoulder-engaging tips of the dog means are correspondingly beveled, for retractive movement of the dog means independently of but upon retractive movement of the toggle devices, under the influence of pressure applied to the plunger at either end thereof, and axial shifting of the assembly under the same pressure, in either direction.

6. A midstroke locking device comprising a cylinder arranged for connection to a first member and ported at its opposite ends for admission of pressure fluid to either end and relief from the opposite end, a piston slidable axially within said cylinder, and itself axially bored, a piston rod projecting from said piston through one end of the cylinder for connection to a second member movable relative to the first member, a plunger fitting within the piston's bore for axial movement therein, and exposed to cylinder pressure at the end distant from the piston rod, a spring operatively connected to said plunger to urge it away from the piston rod, in opposition to pressure at its exposed end, a port in the piston admitting fluid pressure from the piston rod end of the cylinder into the piston's bore, at the side of the plunger to shift the latter in opposition to its spring, dogs mounted in the piston and guided for radial projective and retractive movements, shoulders within the cylinder wall, intermediate its ends, engageable by said dogs and located to lock the piston in a midstroke position against axial movement in either direction, toggle links pivotally mounted upon the plunger for swinging outwardly, and operatively connected to the dogs to project the latter into locking position when so swung outwardly, to secure the two members against relative movement, or to free the dogs for retractive movement when the toggle links are swung inwardly, and a detent carried by the piston and engageable with the dogs when in retracted position, to retain them unlocked while the piston moves with relation to the shoulder to either side of its locked position.

7. A securing device as set forth in claim 6, wherein the shoulders are beveled, and the shoulder-engaging tips of the dogs are complementally beveled, to effect retraction of the dogs when the toggle links are swung inwardly, and pressure is applied at either side of the piston.

8. A midstroke locking device comprising a main cylinder arranged for connection to a first member and ported at its opposite ends for admission of pressure fluid to either end and relief from the opposite end, a main piston slidable axially within said main cylinder, and itself axially bored, a piston rod projecting from said main piston through one end of the cylinder for connection to a second member movable relative to the first member, a plunger fitting within the main piston's bore for axial movement, and subject to pressure in the cylinder end distant from the rod, a supplemental piston carried by said plunger at the rod end of the main piston, the main piston having a supplemental cylinder wherein said supplemental piston is axially reciprocable, with its rod end exposed to low pressure, passage means affording communcation between the opposite end of the supplemental cylinder and the rod end of the main cylinder, for movement of the supplemental piston and plunger towards the rod end of the main piston when subjected to pressure at either end of the main cylinder, spring means to return the plunger and supplemental piston to an initial position in the absence of pressure at either end of the main cylinder, and complemental fixed and movable locking elements carried by the cylinder and by the main piston, respectively, for interengagement when brought into registry by the axial movement of the piston, said spring means and plunger being operatively connected to the movable piston-carried locking element to urge the latter into locking position only in the absence of pressure applied to the main piston from either end of the main cylinder.

References Cited in the file of this patent

UNITED STATES PATENTS

| | | |
|---|---|---|
| 1,842,776 | Bogoslowsky | Jan. 26, 1932 |
| 2,685,275 | Caldwell | Aug. 3, 1954 |
| 2,744,501 | Chace et al. | May 8, 1956 |
| 2,764,132 | Bakke | Sept. 25, 1956 |